US011035080B2

(12) United States Patent
Zhang et al.

(10) Patent No.: US 11,035,080 B2
(45) Date of Patent: Jun. 15, 2021

(54) BORONIC ACID CONTAINING POLYMERS FOR PAPERMAKING PROCESS

(71) Applicant: ECOLAB USA INC., St. Paul, MN (US)

(72) Inventors: Zhiyi Zhang, Naperville, IL (US); Mingli Wei, Naperville, IL (US); Kevin McDonald, Naperville, IL (US); Weiguo Cheng, Naperville, IL (US); Pious V. Kurian, Sugar Land, TX (US)

(73) Assignee: ECOLAB USA INC., St. Paul, MN (US)

( * ) Notice: Subject to any disclaimer, the term of this patent is extended or adjusted under 35 U.S.C. 154(b) by 126 days.

(21) Appl. No.: 15/767,082

(22) PCT Filed: Dec. 14, 2016

(86) PCT No.: PCT/US2016/066607
§ 371 (c)(1),
(2) Date: Apr. 9, 2018

(87) PCT Pub. No.: WO2017/106310
PCT Pub. Date: Jun. 22, 2017

(65) Prior Publication Data
US 2018/0327972 A1    Nov. 15, 2018

Related U.S. Application Data

(60) Provisional application No. 62/267,204, filed on Dec. 14, 2015.

(51) Int. Cl.
*D21H 17/37*    (2006.01)
*D21H 21/10*    (2006.01)
(Continued)

(52) U.S. Cl.
CPC ......... *D21H 17/375* (2013.01); *C08F 220/56* (2013.01); *C08F 230/06* (2013.01);
(Continued)

(58) Field of Classification Search
CPC ...... D21H 21/10; D21H 17/37; D21H 17/375; D21H 21/12; D21H 21/28; D21H 21/36;
(Continued)

(56) References Cited

U.S. PATENT DOCUMENTS 6,576,086 B1 * 6/2003 Ettl ........................... C08F 8/32
                                                    162/164.3
6,716,311 B1 * 4/2004 Decker ..................... C08F 8/00
                                                    162/164.3
(Continued)

FOREIGN PATENT DOCUMENTS

CN    103865060 A    6/2014
CN    103966892 A    8/2014
(Continued)

OTHER PUBLICATIONS

Machine Translation of CN 103865060 A (Year: 2014).*
(Continued)

*Primary Examiner* — Jose A Fortuna
(74) *Attorney, Agent, or Firm* — Eric D. Babych; Barnes & Thornburg LLP

(57) ABSTRACT

Papermaking additives that include various polymers and/or micropolymers are disclosed. The micropolymers may have a network structure that can be created by crosslinking or other means. The micropolymer may be an acrylamide based polymer having a boronic acid moiety. The weight average molecular weight of the micropolymer may be greater than 1,000,000.

15 Claims, 2 Drawing Sheets

(51) Int. Cl.
*C08F 220/56* (2006.01)
*C08F 230/06* (2006.01)
*D21H 21/12* (2006.01)
*D21H 21/28* (2006.01)
*D21H 21/36* (2006.01)
*D21H 21/50* (2006.01)
*C08F 220/06* (2006.01)

(52) U.S. Cl.
CPC ............. *D21H 17/37* (2013.01); *D21H 21/10* (2013.01); *D21H 21/12* (2013.01); *D21H 21/28* (2013.01); *D21H 21/36* (2013.01); *D21H 21/50* (2013.01); *C08F 220/06* (2013.01)

(58) Field of Classification Search
CPC ........ D21H 21/50; D21H 17/17; D21H 21/16; C08F 220/06; C08F 220/56; C08F 230/06
See application file for complete search history.

(56) References Cited

U.S. PATENT DOCUMENTS

| | | | | |
|---|---|---|---|---|
| 7,943,713 B2* | 5/2011 | Pelton | ................... | C08F 226/02 526/239 |
| 9,133,578 B2* | 9/2015 | Ruda | ................... | C08B 37/0057 |
| 2008/0082198 A1* | 4/2008 | Gray | ......................... | D21F 3/00 700/128 |
| 2008/0099172 A1* | 5/2008 | Pelton | ...................... | C08F 8/42 162/164.6 |
| 2011/0174453 A1 | 7/2011 | Przybyla et al. | | |
| 2012/0004148 A1 | 1/2012 | Ogle et al. | | |
| 2014/0262090 A1* | 9/2014 | Brotherson | ............. | C08F 20/56 162/164.6 |
| 2018/0327972 A1* | 11/2018 | Zhang | ................... | C08F 230/06 |
| 2018/0334601 A1* | 11/2018 | Furman, Jr. | ............. | D21F 5/181 |
| 2020/0024148 A1* | 1/2020 | Wang | ................... | C01F 7/0653 |

FOREIGN PATENT DOCUMENTS

| | | | | |
|---|---|---|---|---|
| WO | WO-9916708 A1 * | 4/1999 | ............. | C01B 35/10 |
| WO | WO-9954551 A1 * | 10/1999 | ............. | D21H 21/10 |
| WO | WO-0066492 A1 * | 11/2000 | ........... | C01B 33/141 |
| WO | WO 2006/010268 A1 | 2/2006 | | |
| WO | WQ-2006010268 A1 * | 2/2006 | ............ | C08F 226/02 |
| WO | WO-2017106310 A1 * | 6/2017 | ............ | C08F 230/06 |

OTHER PUBLICATIONS

International Search Report and Written Opinion for corresponding International Application No. PCT/US2016/066607, 7 pages (dated Mar. 28, 2017).

\* cited by examiner

BORONIC ACID CONTAINING POLYMERS FOR PAPERMAKING PROCESS

CROSS-REFERENCE TO RELATED APPLICATION

This application claims priority to U.S. Patent Application Ser. No. 62/267,204 filed on Dec. 14, 2015, the disclosure of which is incorporated herein by reference in its entirety.

BACKGROUND

1. Field of the Invention

The present disclosure generally relates to papermaking. More particularly, the present disclosure relates to chemical additives capable of improving drainage, retention, and formation during a papermaking process.

2. Description of the Related Art

Retention, drainage, and formation (RDF) additives affect the phenomena that take place in the wet end operations of a paper machine during a papermaking process. The effect is based on ionic interactions between oppositely charged chemicals and furnish components. Typically, ionic reactions are assumed to be infinitely fast and thus, chemical kinetics can usually be assumed to be of minor interest. Therefore, the residence time for RDF additives to take effect is usually limited by physical mixing.

Introduction of RDF additives into the flowing suspension of a papermaking furnish is challenging due to a relatively small amount of RDF additives to be mixed in a large flow of furnish. The typical ratio to be mixed is about 1:1000. On the other hand, mixing should be as rapid as possible to minimize the RDF deactivation due to local overdose because of improper mixing, polymer adsorption, and shear effects caused by the approach system pipe and related components, such as pumps, pressure screens, and the headbox.

In a conventional RDF system, all components are dosed before the headbox. A common dosing point is before the headbox fan pump or a pressure screen, mainly to break-up the flocs and improve the mixing profiles. RDF additives may also be added post-screen. Additional points of addition of the RDF additives include between the pressure screen and the headbox or into the pressure screen. In paper machines, a typical residence time for an RDF additive added to the headbox is between about 2 and 10 seconds. When exposed to shear in the pump/screen, the RDF additive-induced fiber flocs break up. As the system is allowed to reflocculate, the bridging mechanisms of other RDF components dosed post-screen is believed to maintain the same structure as in the initial flocculated state. The main effect is that the retention and drainage responses are the same as those before the shear.

Long residence times of RDF additives from the dosing point to the forming section also makes the control of RDF chemistry more challenging. In addition, the capability to affect a specific sheet property decreases if the distance between the feeding location and the section where the sheet properties are fixed is long. Hence, in many cases, it has been observed that closer or even direct feed of the RDF additives into the headbox increases the performance, meaning increased retention, drainage, and floc size.

There are several existing technologies to introduce RDF additives into the headbox, such as using the dilution headbox stream or special channels inside the headbox installed hardware. The use of the dilution stream concept is not preferred as the anionic dilution streams reduce the performance of cationic RDF additives and limit the application to only anionic RDF additives. In addition, a dilution stream is applied in the headbox to decrease the basis weight locally, e.g., to control the basis weight profile variation. The response from each individual dilution valve is partly hindered if RDF additives are applied with the dilution stream due to increased local retention, e.g., increased basis weight. Hardware modifications of a headbox are not preferred due to the relative high investment costs and long shut down periods for installations.

Currently, RDF additives may generally be selected from flocculants, coagulants, and inorganic particulates. When one or more of these chemistries are added to an aqueous slurry containing cellulose fibers, fines, fillers, etc., sheet formation is facilitated with observed improvements in some properties, such as retention and dewatering, but other properties of the resulting paper sheet may be sacrificed. Thus, there is a need for new RDF additives that provide improved retention, drainage, and formation properties without sacrificing other properties, such as the strength, of the paper or paperboard.

BRIEF SUMMARY

The present disclosure relates to RDF additives and methods of using the same. In one aspect, the disclosure relates to a method of increasing retention, drainage, and formation properties in a papermaking process comprising adding an effective amount of an additive to the papermaking process, wherein the additive comprises a polymer having a boronic acid moiety.

The present disclosure also provides for the use of an additive for increasing retention, drainage, and formation properties in a papermaking process, comprising adding an effective amount of the additive to the papermaking process, wherein the additive comprises an acrylamide containing polymer having a boronic acid moiety.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

A detailed description of the invention is hereafter described with specific reference being made to the drawings in which.

DETAILED DESCRIPTION

Figure 1:
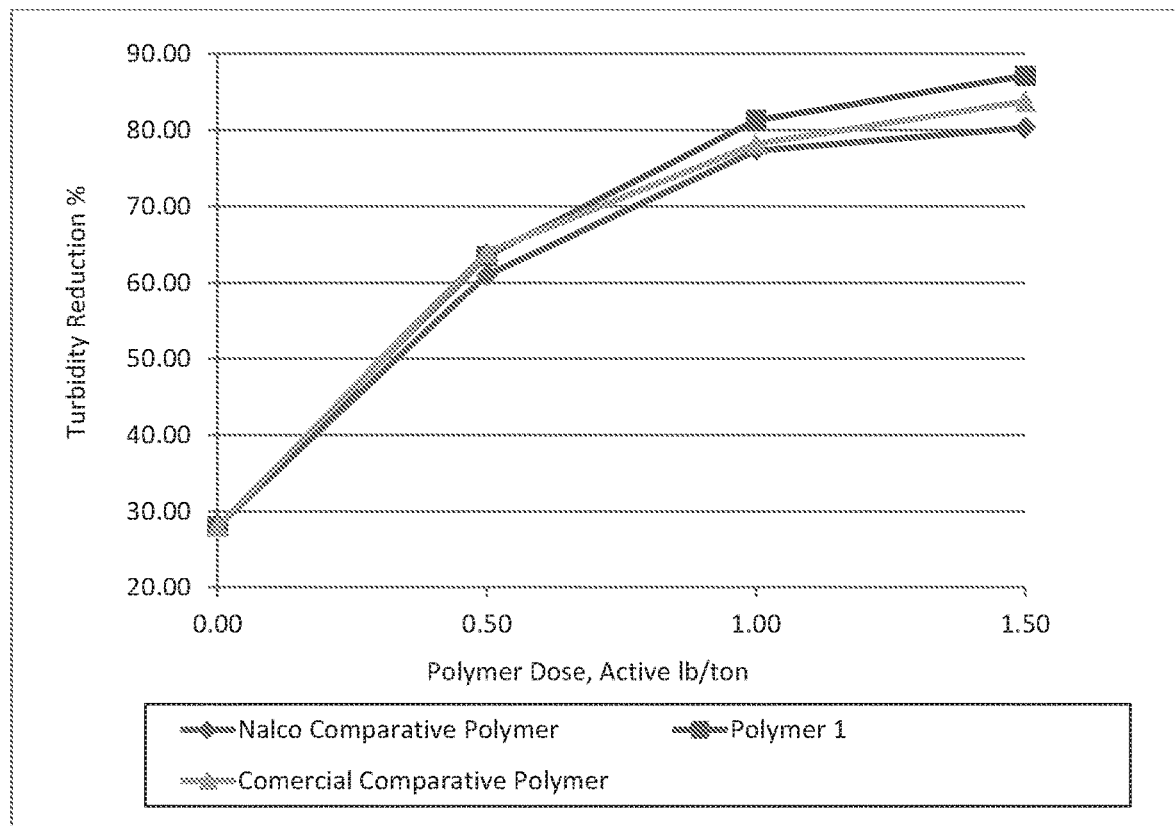
FIG. 1 shows turbidity reduction data in relation to an embodiment of a presently disclosed additive.

Various embodiments are described below. The relationship and functioning of the various elements of the embodiments may better be understood by reference to the following detailed description. However, embodiments are not limited to those explicitly described below.

In accordance with the present disclosure, the terms "papermaking process" and "papermaking processes" refer to methods of making any kind of paper products (e.g., paper, tissue, board, etc.) from pulp comprising forming an aqueous cellulosic papermaking furnish, draining the furnish to form a sheet and drying the sheet. The steps of forming the papermaking furnish, draining, and drying may be carried out in any manner known to those skilled in the art. A papermaking process may also include a pulping stage, e.g., making pulp from wood and/or non-wood raw material, and a bleaching stage, e.g., chemical treatment of the pulp for brightness improvement.

"Coagulant" means a composition of matter having a higher charge density and lower molecular weight than a flocculant, which, when added to a liquid containing finely divided suspended particles, destabilizes and aggregates the solids through the mechanism of ionic charge neutralization.

"Dewatering Aid" means chemical additives that will improve the dewatering of a paper web, at any point in the process. The dewatering aid may improve free drainage, vacuum drainage, pressing response, etc.

"Flocculant" means a composition of matter having a low charge density and a high molecular weight (generally in excess of 1,000,000 Da) which, when added to a liquid containing finely divided suspended particles, destabilizes and aggregates the solids through the mechanism of interparticle bridging.

"RSV" stands for Reduced Specific Viscosity. The RSV of a polymer solution is a measure of the capacity of polymer molecules to enhance the viscosity of the solution at a given concentration, which depends on the structure of the polymer molecules (including size and shape), and interaction between polymer molecules. Within a series of polymer homologs which are substantially linear and well solvated, RSV measurements for dilute polymer solutions are an indication of polymer chain length and average molecular weight according to Paul J. Flory, in "Principles of Polymer Chemistry", Cornell University Press, Ithaca, N.Y., 1953, Chapter VII, "Determination of Molecular Weights", pp. 266-316. The RSV is measured at a given polymer concentration and temperature and calculated as follows:

$$RSV = \frac{\left[\left(\frac{\eta}{\eta_0}\right) - 1\right]}{c}$$

wherein $\eta$=viscosity of polymer solution; $\eta_0$=viscosity of solvent at the same temperature; and c=concentration of polymer in solution. The units of concentration "c" are (grams/100 ml or g/deciliter). Therefore, the units of RSV are dL/g. In this patent application, for measuring RSV, the solvent used was 1.0 molar sodium nitrate solution. The polymer concentration in this solvent was 0.045 g/dL. The RSV was measured at 30° C. The viscosities $\eta$ and $\eta_0$ are measured using a Cannon Ubbelohde semi-micro dilution viscometer, size 75. The viscometer is mounted in a perfectly vertical position in a constant temperature bath adjusted to 30±0.02° C. The error inherent in the calculation of RSV is about 2 dL/g. When two polymer homologs within a series have similar RSVs, that is an indication that they have similar molecular weights.

The processes disclosed herein can be practiced on conventional papermaking equipment. Although papermaking equipment varies in operation and mechanical design, the processes by which paper is made on different equipment contain common stages. Papermaking typically includes a pulping stage, a bleaching stage, a stock preparation stage, a wet end stage, and a dry end stage.

In the pulping stage, individual cellulose fibers are liberated from a source of cellulose by mechanical and/or chemical action. Representative sources of cellulose include, but are not limited to, wood and similar "woody" plants, soy, rice, cotton, straw, flax, abaca, hemp, bagasse, lignin-containing plants, and the like. Sources of cellulose also include original and recycled paper, paper tissue, and paperboard.

Pulps include, but are not limited to, groundwood (GWD), bleached groundwood, thermomechanical pulps (TMP), bleached thermomechanical pulps, chemi-thermomechanical pulps (CTMP), bleached chemi-thermomechanical pulps, deinked pulps, kraft pulps, bleached kraft pulps, sulfite pulps, and bleached sulfite pulps. Recycled pulps may or may not be bleached in the recycling stage, but they are presumed to be originally bleached. Any of the pulps described above which have not previously been subjected to bleaching may be bleached as described herein to provide a bleached pulp material.

In an embodiment, the bleached pulp material is selected from the group consisting of virgin pulp, recycled pulp, kraft, sulfite pulp, mechanical pulp, any combination of such pulps, recycled paper, paper tissue, and any paper made from such listed pulps, or combinations thereof.

The pulp is suspended in water to form a stock in the stock preparation stage. Additives such as brightening agents, dyes, pigments, fillers, antimicrobial agents, defoamers, pH control agents, and drainage additives may be added to the stock at this stage. In accordance with the present disclosure, "stock preparation" includes such operations as dilution, screening, and cleaning of the stock suspension that may occur prior to forming the web.

The wet end stage of the papermaking process comprises depositing the stock suspension or pulp slurry on the wire or felt of the papermaking machine to form a continuous web of fibers, draining the web, and consolidation of the web ("pressing") to form a sheet. Typical machines used for these processes include, but are not limited to, cylinder machines, fourdrinier machines, twin wire forming machines, tissue machines, and the like.

In the dry end stage of a papermaking process, the web is dried and may be subjected to additional processing, such as size pressing, calendering, spray coating with surface modifiers, printing, cutting, corrugating, and the like. The dried paper may also be coated using a sprayboom.

High speed paper machines and paper furnish with high filler content require micropolymers to achieve higher retention and drainage, as well as good paper sheet quality. The presently disclosed RDF additive achieves these objectives. In accordance with the present disclosure, the terms "RDF additive" and "additive" may be used interchangeably. An additive may comprise one or more polymers and/or one or more micropolymers, as defined herein.

The presently disclosed additive may be added at any stage of the papermaking process. In some embodiments, the additive is added to the stock (i.e. the pulp suspended in water). The stock may be a thin stock or a thick stock. In certain embodiments, the additive is added at any location, and at any time, during the wet end stage of the papermaking process.

The additive may comprise various polymers and/or micropolymers. As used herein, the term "micropolymer" refers to a polymer containing a structured network that acts as a microparticle in paper furnish and functions as a flucculation and drainage aid in a papermaking process. Micropolymer also refers to a polymeric microparticle in a papermaking process. A micropolymer may be a polymer but it additionally has a network structure that can be created by crosslinking or other means.

In some embodiments, the micropolymer is an acrylamide based polymer comprising a boronic acid moiety. In certain embodiments, the micropolymer excludes vinylamine based polymers. The weight average molecular weight of the presently disclosed micropolymer may be, for example, greater than 1,000,000 Da. In some embodiments, the molecular weight is from about 1,000,000 Da to about 5,000,000 Da, from about 5,000,000 Da to about 10,000,000 Da, or greater than 10,000,000 Da.

In some embodiments, the additive comprises a boronic acid containing polymer and/or a boronic acid containing micropolymer. This additive provides improved RDF properties. For example, in one embodiment, a stock (aqueous suspension of pulp) is provided and an additive comprising polyacrylamide having a boronic acid moiety is added to the stock. The polyacrylamide, and any of the polymers or micropolymers disclosed herein, may be, for example, neutral, ionic (e.g. cationic, anionic), linear, crosslinked and/or branched.

In some embodiments, the polymer or micropolymer of the additive comprises polyacrylamide. The polyacrylamide may be prepared, for example, by radical polymerization of acrylamide and at least one vinyl monomer containing a boronic acid moiety. In certain embodiments, the vinyl monomer may be selected from 3-(acrylamido)phenylboronic acid, 2-(acrylamido)phenylboronic acid, 4-(acrylamido)phenylboronic acid, 3-(methacrylamido)phenylboronic acid, 2-(methacrylamido)phenylboronic acid, 4-(methacrylamido)phenylboronic acid, 2-vinylphenylboronic acid, 3-vinylphenylboronic acid, and/or 4-vinylphenylboronic acid. In some embodiments, other monomers may be included in the polymerization reaction. Such other monomers include, but are not limited to, (meth)acrylic acid, salts of (meth)acrylic acid, 2-acrylamido-2-methylpropane sulfonic acid (AMPS), salts of AMPS, and 2-(acryloyloxy)-N,N,N-trimethylethanaminium (DMAEA.MCQ) and diallyldimethylammonium chloride (DADMAC). In some embodiments, the comonomers are selected from the group consisting of (meth)acrylic acid, salts of (meth)acrylic acid, 2-(acryloyloxy)-N,N,N-trimethylethanaminium (DMAEA.MCQ), and any combination thereof. The mole percent of acrylamide to comonomer (or combination of comonomers) in a polymer or micropolymer is about 1-99 mole %, and, in some embodiments, the mole percent of boronic acid containing monomer to other monomers in the polymer is about 0.001 to about 20 mole %.

In some embodiments, the polymers and micropolymers of the additive may be cationic, nonionic, anionic, amphoteric, or associative. In certain embodiments, the polymers and micropolymers may be crosslinked using an appropriate crosslinking agent. Exemplary crosslinking agents include, but are not limited to, N,N-methylene bisacrylamide (MBA), polyethyleneglycol diacrylate, polyvinylalcohol, dextran, and guar. Additionally, the polymers and micropolymers of the additive may be in latex form, may be provided in an aqueous solution, or may be provided in a dry powder form.

The additive disclosed herein may be added to the papermaking process, such as to the stock, alone or, in some embodiments, the additive may be added before, after, and/or with other papermaking chemicals. Such other papermaking chemicals include, but are not limited to, cationic polymers selected from naturally occurring carbohydrates, synthetic linear, branched, and/or cross-linked flocculants, organic microparticulates, copolymers of acrylamide and diallyldimethylammonium chloride, copolymers of dimethyl aminoethyl (meth)acrylate and acrylamide, copolymers of (meth)acrylic acid and acrylamide, copolymers of dimethyl aminoethyl (meth)acrylate and acrylamide, copolymers of dimethyl aminoethyl (meth)acrylate-methyl chloride quat and acrylamide, and terpolymers of dimethyl aminoethyl (meth)acrylate, acrylamide, and (meth)acrylic acid, for example.

Other papermaking chemicals also include various anionic polymers, such as homo and copolymers of acrylic acid, and copolymers of methacrylamide 2-acrylamido-2-methylpropane sulfonate with acrylamide or methacrylamide. Additionally, the other papermaking chemicals may comprise non-ionic polymers, such as polyethylene oxide and polyacrylamide, and they may also comprise various coagulants. For example, coagulants may include organic coagulants, such as polyalkylenepolyamines, prepared from epichlorohydrindimethylamine and ethyleneimines. Inorganic coagulants may also be included, such as alum, polyaluminum chloride, and polyaluminum silicate sulfate. Other papermaking chemicals that may be added before, with, and/or after the additive include brightening agents, dyes, pigments, fillers, antimicrobial agents, defoamers, and pH control agents.

Again, the presently disclosed additive may be added to the stock, wet end, or other location alone, or it may be added before, after, and/or with any of the foregoing additional papermaking chemicals, any combination of the foregoing papermaking chemicals, or any other chemicals traditionally added to the stock, wet end, or other locations of a papermaking machine.

The amount of additive added can be chosen to suit the particular application. In some embodiments, the effective amount of additive to be added is from about 0.05 lb/ton of paper to about 10 lb/ton of paper.

The point of addition of the presently disclosed additive is not particularly limited. In one embodiment, the additives are added directly to the stock. In some embodiments, the additives may be added between a headbox slice opening and a first drainage element of a papermaking machine. In another embodiment, the additives may be applied to a headbox free jet of a papermaking machine (i.e. the fluid that flows out from the headbox). The additives may also be added to a reflocculation region of the machine, prior to formation of the paper web. A reflocculation region is typically the area between 0 cm (at exit point) and 20 cm from the headbox in the direction of the forming wire. Other exemplary points of addition include, but are not limited to, the dilution headbox stream or channels inside the headbox installed hardware.

The application of the additive to the papermaking process can encompass a variety of different methods. For example, the additive may be added using non-contact methods or non-contact applicators, which are commonly known in the art.

In one embodiment, the additive may be applied to the papermaking process using a chemical injection pump or it may be added manually to the stock, for example. The additive may be applied using a spray bar, optionally wherein the spray bar is installed onto a headbox top slice cover. In another embodiment, the additive may be applied to the papermaking process by a curtain applicator. In additional embodiments, the additive may be applied to the papermaking process using a slice blade.

EXAMPLES

"Polymer 1", an inverse emulsion polymer comprising 30% actives, 70/30 mole percent acrylamide/acrylic acid (AcAm/AA), and 0.5 weight percent 3-(acrylamido)phenylboronic acid (APBA), was synthesized in the following manner:

An aqueous monomer phase was made-up by stirring together about 422.4 g of a 49.5% aqueous solution of acrylamide (AcAm), about 90.9 g acrylic acid (AA), and about 65.6 g de-ionized water. The solution was neutralized with about 97 g 50% sodium hydroxide to a pH of about 7 while the temperature was controlled below 35° C. with ice water bath. To the resulting solution was added about 25 g sodium chloride, about 1.5 g 3-(acrylamido)phenylboronic acid (APBA), about 0.13 g EDTA.Na$_4$ (ethylenediaminetetraacetic acid, tetra sodium salt), and about 0.1 g sodium formate. The components were stirred until dissolved.

An oil phase was prepared by heating a mixture of about 250 g paraffinic oil, about 12.0 g Span™ 80 and about 15 g Tween™ 81. The oil phase was charged into a 2 L reactor and heated to about 43° C. With vigorous stirring (900 rpm, 10 mm rod with a Teflon™ paddle at the base and 6-blade turbine mounted 3-inches from the bottom), the monomer phase was added over the course of about two minutes. The resulting mixture was stirred for about 30 minutes.

To the water-in-oil emulsion was added about 0.27 g azobisisobutyronitrile (AIBN) and about 0.027 g 2,2'-azobisisovaleronitrile (AIVN). The polymerization was carried out under a N$_2$ atmosphere at about 43° C. for about 4 hours. Then, the temperature was set to about 70° C. for one hour. After, the emulsion was cooled down to about 35° C. and about 20 g ethoxylated fatty alcohol was added with stirring.

"Polymer 2", an inverse emulsion polymer comprising 30% actives, 70/30 mole percent AcAm/AA, 0.13 weight percent polyvinylalcohol, and 0.1 weight percent APBA, was synthesized as follows:

An aqueous monomer phase was made-up by stirring together about 422.4 g of 49.5% aqueous solution of acrylamide, about 90.9 g acrylic acid, and about 65.6 g de-ionized water. The solution was neutralized with about 97 g 50% sodium hydroxide to a pH of about 9.0 while the temperature was controlled below 35° C. with an ice water bath. To the resulting solution was added about 0.13 g EDTA.Na$_4$, about 25 g sodium chloride, about 0.3 g APBA, about 5.52 g of 7.25% polyvinyl alcohol (Celvol™ 08-125), and about 0.1 g sodium formate. The components were stirred until dissolved.

An oil phase was prepared by heating a mixture of about 250 g paraffinic oil, about 12.0 g Span™ 80 and about 15 g Tween™ 81. The oil phase was charged into 2 L reactor and heated to about 43° C. With vigorous stirring (900 rpm, 10 mm rod with a Teflon™ paddle at the base and 6-blade turbine mounted 3-inches from the bottom), the monomer phase was added over the course of about two minutes. The resulting mixture was stirred for about 30 minutes.

To the water-in-oil emulsion was added about 0.27 g AIBN and about 0.027 g AIVN. The polymerization was carried out under a N$_2$ atmosphere at about 43° C. for about 4 hours. The temperature was then set to about 70° C. for one hour. The emulsion was cooled down to about 35° C. and about 20 g ethoxylated fatty alcohol was added with stirring.

Various experiments were carried out to show the surprisingly beneficial RDF properties of the presently disclosed additive. In one experiment (Example 1), the additive was evaluated using a dynamic drainage jar (DDJ) method. The additive comprised a boronic acid containing acrylamide/acrylic acid copolymer (Polymer 1 having a RSV of about 16) and this additive was tested against "Nalco Comparative Polymer" which is an inverse emulsion polymer comprising 30% actives, 70/30 mole percent acrylamide/acrylic acid with a RSV of about 37 and "Commercial Comparative Polymer" which is a commercial product containing about 30% actives, 50/50 mole percent acrylamide/acrylic acid with a RSV of about 16.

In the DDJ test, the standard alkaline furnish (SAF) had a pH of about 8.1 and was composed of about 80% by weight cellulosic fibers and about 20% precipitate calcium carbonate diluted to a consistency of about 0.5% by weight. The fiber comprised about ⅔ bleached hardwood kraft and about ⅓ bleached softwood kraft. About 500 ml SAF furnish was charged in a Britt jar and mixed at about 1250 rpm. Starch Solvitose® N was then added at about 10 lb/ton dry weight after about 5 seconds. Polyaluminum Chloride (PAC) was added after about 10 seconds. Then, the additive (or comparative example product) was added after about 20 seconds. Drain started at about 30 seconds and ended at about 60 seconds. The drain (filtrate) was collected for turbidity measurement. The turbidity of the filtrate is inversely proportional to the furnish retention performance. The turbidity reduction % is proportional to the retention performance of the retention program. The higher the turbidity reduction %, the higher the retention of the paper furnish.

The results of this experiment are depicted in FIG. 1. The data indicate that when the additive is used as a flocculant for retention, it exhibited higher turbidity reduction than Commercial Comparative Polymer and Nalco Comparative Polymer. Again, the higher the turbidity reduction, the better the paper furnish retention.

In another experiment (Example 2), a DDJ method was carried out to study first pass ash retention. The additive studied was "Polymer 2" with a RSV of about 21, which was added as an aqueous solution. This additive was tested against Commercial Comparative Polymer.

The alkaline furnish has a pH of about 8.1 and comprised about 77% by weight cellulosic fibers and about 23% precipitate calcium carbonate diluted to a consistency of about 0.5% by weight. The fiber comprised about ⅔ bleached hardwood kraft and about ⅓ bleached softwood kraft. About 500 ml SAF furnish was charged to a Britt jar and mixed at about 1250 rpm. Starch Solvitose® N and PAC were then co-charged at 10 lb/ton dry weight and about 3.9 lb/ton of paper after about 5 seconds. Then, Nalco Comparative Polymer and the additive (or comparative product) were co-charged to the jar after about 15 seconds. Drain started after about 25 seconds and ended at about 55 seconds. The drain (filtrate) was collected for first pass ash retention measurement. The higher the first pass ash retention %, the higher the retention of the paper furnish.

Figure 2:
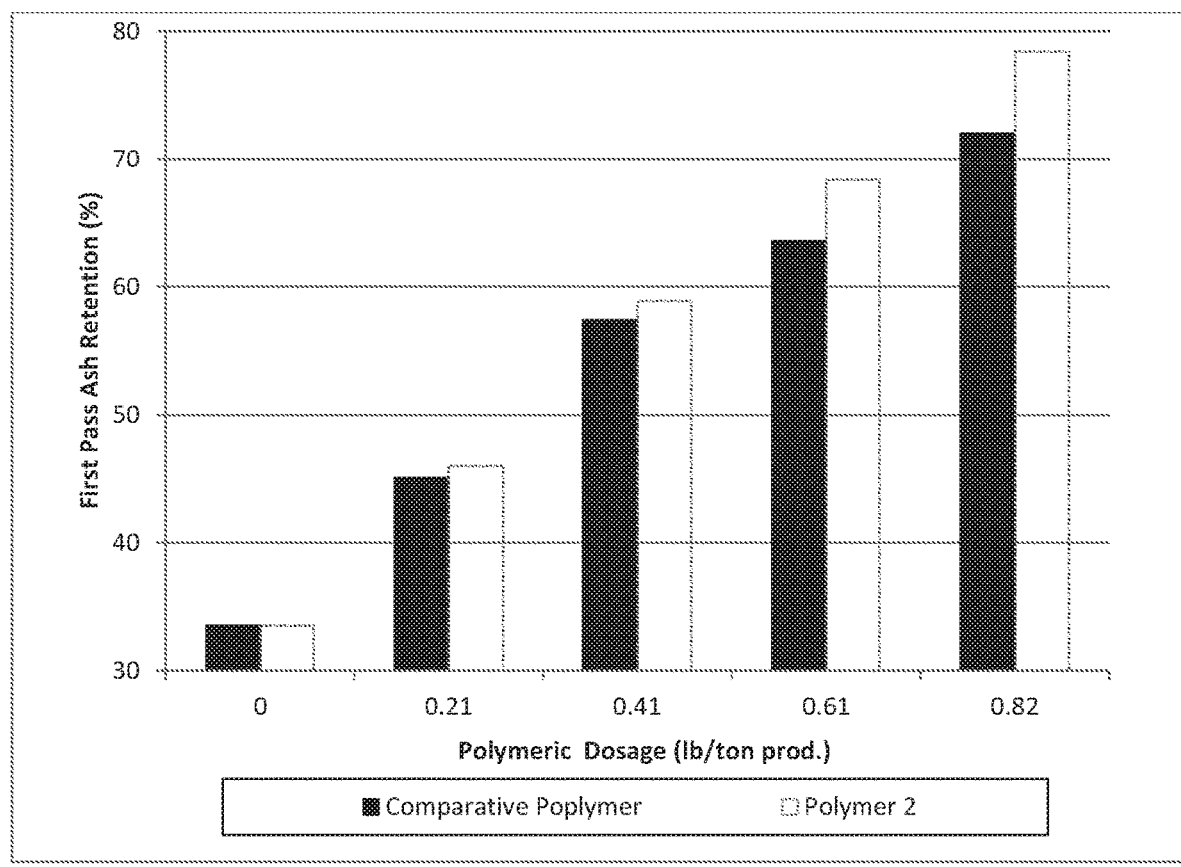
FIG. 2 shows first pass ash retention data in relation to an embodiment of a presently disclosed additive.

Data from this experiment is depicted in FIG. 2. The data shows that when using the micropolymer additive for retention, it exhibits higher ash retention than the comparative polymers. Again, the higher the ash retention, the better the paper furnish retention.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a polymer" is intended to include "at least one polymer" or "one or more polymers."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of increasing retention, drainage, and formation properties in a papermaking process comprising adding an effective amount of an additive to the papermaking process, wherein the additive comprises an acrylamide containing polymer having a boronic acid moiety,
    wherein the polymer comprises from about 0.001 to about 20 mole % of a monomer comprising the boronic acid moiety,
    wherein the monomer comprising the boronic acid moiety is selected from the group consisting of 3-(acrylamido)phenylboronic acid, 2-(acrylamido)phenylboronic acid, 4-(acrylamido)phenylboronic acid, 3-(methacrylamido)phenylboronic acid, 2-(methacrylamido)phenylboronic acid, 4-(methacrylamido)phenylboronic acid, and any combination thereof.

2. The method of claim 1, wherein the polymer is cationic, anionic, amphoteric, zwitterionic, or associative.

3. The method of claim 1, wherein the polymer additionally comprises a monomer selected from the group consisting of (meth)acrylic acid, salts of (meth)acrylic acid, 2-acrylamido-2-methylpropane sulfonic acid (AMPS), salts of AMPS, 2-(acryloyloxy)-N,N,N-trimethylethanaminium (DMAEA.MCQ), diallyldimethylammonium chloride (DADMAC), and any combination thereof.

4. The method of claim 1, wherein the additive is added in latex form, as an aqueous solution, or in dry powder form.

5. The method of claim 1, wherein the additive is added before, after, and/or with an additional chemical selected from the group consisting of a naturally occurring carbohydrate, a flocculant, an organic microparticulate, a copolymer of acrylamide and diallyldimethylammonium chloride, a copolymer of dimethyl aminoethyl (meth)acrylate and acrylamide, a copolymer of (meth)acrylic acid and acrylamide, a copolymer of dimethyl aminoethyl (meth)acrylate and acrylamide, a copolymer of dimethyl aminoethyl (meth)acrylate-methyl chloride quat and acrylamide, a terpolymer of dimethyl aminoethyl (meth)acrylate, acrylamide, and (meth)acrylic acid, a homopolymer of acrylic acid, a copolymer of acrylic acid, a copolymer of methacrylamide 2-acrylamido-2-methylpropane sulfonate and (meth)acrylamide, polyethylene oxide, polyacrylamide, a coagulant, a polyalkylenepolyamine, alum, polyaluminum chloride, polyaluminum silicate sulfate, a brightening agent, a dye, a pigment, a filler, an antimicrobial agent, a defoamer, a pH control agent, and any combination thereof.

6. The method of claim 1, wherein the additive is added during a pulping stage, a bleaching stage, a stock preparation stage, a wet end stage, or any combination thereof.

7. The method of claim 1, wherein the additive is added to a stock.

8. The method of claim 1, wherein the effective amount is from about 0.05 lb/ton of paper to about 10 lb/ton of paper.

9. The method of claim 1, wherein the additive is added using a member selected from the group consisting of a non-contact applicator, a chemical injection pump, a spray bar, a curtain applicator, a slice blade, and any combination thereof.

10. The method of claim 1, wherein the polymer further comprises acrylic acid.

11. The method of claim 1, wherein the additive excludes vinylamine polymers.

12. The method of claim 1, wherein the polymer has a weight average molecular weight of greater than 1,000,000 Da.

13. The method of claim 1, wherein the polymer is a micropolymer.

14. The method of claim 1, wherein the polymer comprises 70 mole % of acrylamide, 30 mole % of acrylic acid, and 0.5 weight % of phenylboronic acid.

15. The method of claim 1, wherein the polymer has a weight average molecular weight of 1,000,000 Da to 5,000,000 Da.

* * * * *